United States Patent [19]

Osborn et al.

[11] 4,189,547
[45] Feb. 19, 1980

[54] HYDROCARBON-DERIVED RESINS OF PIPERYLENE AND METHYL BRANCHED TERTIARY OLEFIN HYDROCARBONS BLENDED WITH OTHER HYDROCARBON RESINS

[75] Inventors: Robert A. Osborn, Stow; Herbert L. Bullard, Norton Village, both of Ohio

[73] Assignee: The Goodyear Tire & Rubber Company, Akron, Ohio

[21] Appl. No.: 895,904

[22] Filed: Apr. 13, 1978

Related U.S. Application Data

[60] Division of Ser. No. 680,395, Apr. 26, 1976, Pat. No. 4,098,983, which is a continuation of Ser. No. 506,387, Sep. 16, 1974, abandoned.

[51] Int. Cl.$^2$ .......................... C08L 7/00; C08L 9/06; C08L 23/18; C08L 53/02
[52] U.S. Cl. .......................................... 525/99; 260/5; 525/216; 525/237
[58] Field of Search ............... 260/5, 889, 894, 876 B, 260/888; 526/290, 237, 339

[56] References Cited

U.S. PATENT DOCUMENTS

| | | | |
|---|---|---|---|
| 2,753,325 | 7/1956 | Banes et al. | 526/290 |
| 3,692,756 | 9/1972 | St. Cyr | 260/888 |
| 3,872,064 | 3/1975 | Pace et al. | 260/888 |
| 3,928,297 | 12/1975 | Thaler et al. | 526/339 |
| 3,966,690 | 6/1976 | Mathews et al. | 526/339 |

*Primary Examiner*—Carman J. Seccuro
*Attorney, Agent, or Firm*—H. C. Young, Jr.

[57] ABSTRACT

A hydrocarbon-derived resin having a softening point in the range of about 0° C. to about 25° C. derived from polymerizing piperylene and selected methyl branched tertiary olefins in the presence of boron trifluoride or boron trifluoride etherate. Such resins are particularly useful for the preparation of pressure sensitive adhesives, especially when such resins are mixed with other hydrocarbon-derived resins having high softening points in the range of about 80° C. to about 110° C.

4 Claims, No Drawings

HYDROCARBON-DERIVED RESINS OF PIPERYLENE AND METHYL BRANCHED TERTIARY OLEFIN HYDROCARBONS BLENDED WITH OTHER HYDROCARBON RESINS

This is a Division, of application Ser. No. 680,395 filed Apr. 26, 1976, now U.S. Pat. No. 4,098,983 which is a continuation of application Ser. No. 506,387, filed Sept. 16, 1974, now abandoned.

This invention relates to resins prepared from piperylene and certain methyl branched olefins.

High softening point tackifying resins for rubbery polymers can be prepared by polymerizing piperylene and 2-methyl-2-butene with aluminum chloride. However, substituting 2-methyl-1-butene for 2-methyl-2-butene in such a system produces a different resin having a lower softening point which cannot be satisfactorily substituted as a tackifier for rubbery polymers in many instances.

Pressure sensitive adhesives often require a mixture of high and low softening point resins to provide proper tack and shear strength. A suitable, typically liquid, low softening point (10° C.–30° C.) resin can be prepared by polymerizing piperylene and 2-methyl-2-butene with boron trifluoride instead of aluminum chloride. When mixed with a higher softening point resin (80° C.–110° C.) prepared from the same monomers polymerized with aluminum chloride, a tackifier for pressure sensitive adhesives is obtained. Based on the disappointing experience with resin derived from piperylene and 2-methyl-1-butene with aluminum chloride, it should surely be expected that substituting 2-methyl-1-butene for 2-methyl-2-butene would not provide a suitable low softening point resin for many pressure sensitive adhesives.

In accordance with this invention, it has been discovered that a hydrocarbon derived resin characterized by a relatively low softening point in the range of about 5° C. to about 25° C., particularly and preferably about 5° C. to about 20° C., is the product of polymerizing in the presence of boron trifluoride or boron trifluoride etherate a mixture which comprises about 30 to about 70 weight percent piperylene and, correspondingly, about 70 to about 30 weight percent of a branched monoolefin selected from methyl branched tertiary α olefins having from 4 to 6 carbon atoms and methyl branched β tertiary olefins having 6 carbon atoms. It is preferred that the monomer mixture to be polymerized comprises from about 45 to about 65 weight percent piperylene and, correspondingly, about 55 to about 35 weight percent of said methyl branched tertiary monoolefin. Preferably said monoolefin is a methyl branched α olefin containing 5 to 6 carbon atoms.

Tertiary monolefins are described herein as olefins which contain a tertiary carbon atom adjacent to its single double bond which will therefore provide a tertiary carbonium ion upon treatment with an acidic catalyst.

Representative of the particular methyl branched α monoolefins are isobutylene, 2-methyl-1-butene, 2-methyl-1-pentene, 2-methyl-2-pentene, 2,3-dimethyl-1-butene and 2,3-dimethyl-2-butene. Particularly preferred is 2-methyl-1-butene.

The hydrocarbon derived resins of this invention prepared from the polymerizable hydrocarbon mixture, are required to have a backbone derived from piperylene/methyl branched olefin and comprise from about 40 to about 75 weight percent units derived from piperylene and correspondingly about 60 to about 25 weight percent units derived from the required branched olefins. Preferably, the resin comprises about 50 to about 70 weight percent units derived from piperylene and correspondingly about 50 to about 30 weight percent units derived from the branched olefins.

The resins of this invention, in addition to their characteristic low softening point, may be further characterized by having a viscosity in the range of about 400 to about 500,000 and preferably about 1,000 to about 40,000, centipoises (cps) at about 25° C. depending somewhat upon the degree of stripping of the resin product to remove light oil-like products and unreacted hydrocarbons. This reference to degree of stripping is not intended to be misleading or ambiguous. Typically, the major portion of the polymerization product is the resin of this invention whereas only a minor portion consists of oil-like products. Reference is made to the degree of stripping only because of the sensitivity of viscosity to very small amounts of low viscosity oil-like products and unreacted hydrocarbons. It is thus desired to strip the product to remove at least about 95 weight percent of such materials.

In the practice of this invention, about 50 to about 85, preferably about 70 to about 80, weight percent of the piperylene/branched olefin mixture is typically converted to the resin of this invention and correspondingly about 5 to about 15 weight percent is converted to dimers, trimers and low molecular weight oil polymers with the remainder usually being less than 5 weight percent essentially unreacted.

The characteristic softening point is determined by ASTM method E-28-58T required to be modified by first cooling the sample below room temperature and then gradually heating it to the resin's softening point.

The polymerization reaction is conveniently carried out in the presence of a diluent because it is usually exothermic. Various diluents which are inert in that they do not enter into the polymerization reaction can be used. Representative examples of inert diluents are aliphatic hydrocarbons such as pentane, hexane, and heptane, aromatic hydrocarbons such as toluene and benzene, and unreacted hydrocarbons from the reaction mixture itself. The aliphatic and unreacted hydrocarbons are preferred.

A wide range of temperatures can be used for the polymerization reaction such as about −50° C. to about 50° C. and preferably in the range of about 0° C. to about 30° C. The reaction can be carried out at atmospheric or above or below atmospheric pressure. Typically, a satisfactory polymerization can be conducted at atmospheric pressure or at about autogeneous pressure developed by the reactants under the operating conditions used. The time of reaction is not particularly of primary importance and can vary from a few minutes to 12 hours or more.

The polymerizate is typically distilled, by steam distilling for example, to remove light oil-like products, unreacted hydrocarbons and solvent if used to yield the product resin. The resin products of this invention are typically soluble in aliphatic hydrocarbons such as pentane, hexane and heptane and in aromatic hydrocarbons such as toluene and benzene.

The liquid polymers or resins of this invention can be modified, so long as they maintain their required piperylene/branched olefin backbone derivation, by the addition of up to about 10 parts by weight of piperylene dimers, or piperylene trimers or other unsaturated hydrocarbons containing 5 to 6 carbon atoms, and mixtures thereof, to 100 parts by weight of the piperylene/branched olefin monomer mixture.

Representative examples of such other unsaturated hydrocarbons are 3-methyl-2-pentene, isoprene and cyclic unsaturated hydrocarbons such as cyclopentene, cyclohexene and 1,3-cyclopentadiene.

In practice, the liquid resins of this invention can comprise up to about 7 weight percent units derived from the described addition of up to about 10 parts by weight to the monomer mixture of piperylene dimers, piperylene trimers and other unsaturated hydrocarbons containing 5 to 6 carbon atoms heretofore mentioned in addition to the required backbone of the units derived from piperylene and branched olefin.

These prepared resinous materials are useful as modifiers for natural rubber and various synthetic rubbers. Representative of such synthetic rubbers are butadiene-styrene copolymers and block copolymers, styrene-acrylonitrile copolymers, isoprene-styrene copolymers and block copolymers and stereo regular addition polymers of dienes such as 1,3-butadiene and isoprene, particularly their rubbery cis-1,4-addition polymers. The resins are usually desirable as extenders and tackifiers in such synthetic elastomeric materials especially where resins are desired which have light colors. The resins of this invention can generally be characterized by having a Gardener color in the range of about 2 to about 5. Their usefulness can be particularly enhanced when comprised as an admixture with natural rubber or various synthetic rubbers, particularly block copolymers of butadiene/styrene and of isoprene/styrene, to form pressure sensitive adhesives. They can especially be blended with other higher softening point resins for this purpose.

In the practice of this invention, the catalyst is required to be selected from boron trifluoride and a boron trifluoride etherate. The boron trifluoride etherate catalyst used to prepare the resin is a complex of the type derived from boron trifluoride and an ether having from 2 to about 12, and preferably from 2 to about 6, carbon atoms. The complex is generally represented by the formula:

$$BF_3 \cdot OR_2$$

Representative of various ethers for preparation of the etherate are those having the structure ROR', where R and R' are individually selected from saturated alkyl radicals having from 1 to about 6, and preferably from 1 to about 3, carbon atoms, such as methyl, ethyl, n-propyl, isopropyl, n-butyl, isobutyl, sec.-butyl, t-butyl, n-pentyl, isopentyl, t-pentyl, isohexyl, n-hexyl and t-hexyl radicals. The ethyl radical is usually preferred. The complex, when not available commercially, can generally be prepared by reacting boron trifluoride gas with an ether in about equimolar quantities in an inert atmosphere at a temperature in the range of about −25° C. to about 25° C., and usually in the range of about 10° C. to about 25° C. Representative of various ethers are dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl (2-ethylhexyl)ether. Diethyl ether is usually preferred.

The following examples further illustrate the invention and are not intended to be limiting. In these examples, parts and percentages are by weight unless otherwise indicated.

EXAMPLE I

To a reactor was charged 100 parts of heptane and 3 parts particulate anhydrous aluminum chloride. While continually stirring the mixture, 200 parts of a hydrocarbon mixture was slowly added to the reactor over a period of about 90 minutes. The hydrocarbon mixture had the following composition as shown in Table 1:

TABLE 1

| Component | Percent |
|---|---|
| 2-methyl-2-butene | 43.0 |
| piperylene | 42.7 |
| cyclopentene | 10.3 |
| other hydrocarbons selected from piperylene dimers, trimers and hydrocarbons containing 5 to 6 carbon atoms | 4.6 |
| | 100.0 |

The temperature of the reaction was maintained in the range of about 28° C. to about 30° C. After the completed addition of the hydrocarbon mixture, the reaction was conducted for about 1 hour at which time the catalyst was deactivated with methanol and lime. The resin mixture was filtered. The recovered resin was steam distilled to a pot temperature of about 235° C. and continued until 2 parts water had been collected as a distillate for 1 part of resin collected in the pot. The resulting resin was poured into a pan to cool and form 122 parts of a hard, brittle, pale yellow resin having a Gardner color of 3.5 and a softening point of 100.5 (ASTM method E28-58T).

EXAMPLE II

A resin was prepared according to the method of Example I with aluminum chloride except that the 2-methyl-2-butene was replaced with 2-methyl-1-butene. A total of 147 parts of a soft, pale yellow resin was obtained having a Gardner color of 3.5 and a softening point of 70.5° C. (ASTM method E28-58T).

Therefore, Example II shows that 2-methyl-1-butene acts in a manner different from 2-methyl-2-butene in the polymerization system to form a resin having a different characteristic, namely a softer resin.

The resins prepared according to Example I and Example II were compared for their ability to impart tack and shear to natural rubber. Test samples were prepared by mixing 50 parts pale crepe natural rubber with 50 parts resin. The results of the tests are more clearly shown in the following Table 2.

TABLE 2

| Resin | Softening Point (°C.) | Tack (inches) | Shear (min) |
|---|---|---|---|
| Example I (2-methyl-2-butene) | 100.5 | 1.20 | 196 |
| Example II (2-methyl-1-butene) | 70.5 | .62 | 67 |

Therefore, the resin of Example II, using 2-methyl-1-butene, cannot satisfactorily be directly substituted for the resin of Example I, using 2-methyl-2-butene.

The tack and shear values were conducted according to Methods PSTC-6 and PSTC-7 of the Pressure Sensitive Tape Council. These methods can be found in the publication "Test Methods for Pressure Sensitive Tapes" developed by the Pressure Sensitive Tape Council, 1201 Waukegan Road, Glenview, Illinois. For example, the tack was measured by rolling a ball down an incline and onto a horizontally positioned sample. The distance in inches was measured which the ball travelled across the sample. Thus, the larger the value for this test, the smaller the amount of tack. The shear strength was measured by applying a 500 gram weight to the sample and measuring the time in minutes required for the tape to separate from the substrate.

EXAMPLE III

Two polymerization runs were carried out, identified herein as Experiments A and B, using essentially piperylene and 2-methyl-2-butene in one reaction, and piperylene and 2-methyl-1-butene in the other, both in the presence of boron trifluoride etherate. To each reactor was charged 100 parts heptane and about 2 parts boron trifluoride etherate. While continually stirring each mixture, 236 parts of a hydrocarbon mixture was slowly added to each reactor over a period of 90 minutes. The hydrocarbon mixture had the following composition shown in Table 3.

TABLE 3

| Compound | Weight Percent | |
|---|---|---|
| | Experiment A | Experiment B |
| 2-methyl-2-butene | 38.0 | — |
| 2-methyl-1-butene | — | 38.0 |
| piperylene | 46.5 | 46.5 |
| cyclopentene | 12.0 | 12.0 |
| other $C_5$'s & $C_6$'s | 3.5 | 3.5 |

The temperature of each reaction was maintained in the range of 25° C. to 30° C. After the addition of each hydrocarbon mixture, the reactions were continued for an additional 60 minutes. The catalyst was deactivated in each reaction with about 4 parts methanol and 20 parts lime. Both resin solutions were filtered and steam distilled. The steam distillation of each resin was continued until 0.25 part of water had been collected for 1 part of resin. Experiment A resulted in 168 parts of a liquid resin. Experiment B resulted in 156 parts of a liquid resin. The resins were measured for viscosity (cps) at 25° C., softening point, color, initial and aged, volatility, tack (inches) and shear (min.). The samples for tack and shear measurements were prepared by mixing 50 parts pale crepe natural rubber, 15 parts resin of Experiment A or B and 35 parts resins of the type prepared according to Example I. The results are summarized in the following Table 4.

TABLE 4

| Exp | Viscosity (25° C.) | S.P. (°C.) | Color (Gardner) | | Volatility (%) | Tack (in) | Shear (min) |
|---|---|---|---|---|---|---|---|
| | | | Initial | Aged* | | | |
| A | 7,100 cps | 0° | 1½ | 10½ | 9.6 | .46 | 59 |
| B | 3,200 cps | −5° | 1½ | 10 | 9.3 | .35 | 50 |

*Aged at 350° F. for 5 hours

These data indicate the two resins to have essentially the same properties and can be substituted for each other in a pressure sensitive adhesive.

EXAMPLE IV

Polymerizations were conducted according to the method of Example III and identified herein as Experiments C and D, except $BF_3$ gas was used as the catalyst instead of $BF_3$ etherate. Each monomer consisted of 200 parts of a hydrocarbon mixture with the following analysis shown in Table 5.

TABLE 5

| Compound | Weight Percent | |
|---|---|---|
| | Experiment A | Experiment B |
| 2-methyl-2-butene | 35 | — |
| 2-methyl-1-butene | — | 35 |
| piperylene | 48.7 | 48.7 |
| cyclopentene | 11.5 | 11.5 |
| other $C_5$'s & $C_6$'s | 4.8 | 4.8 |

These two resins were merely distilled to remove solvent and unreacted hydrocarbon without further steam distillation. Experiment C resulted in 160 parts of a fluid resin while Experiment D resulted in 152 grams of a fluid resin. The tack and shear samples were prepared according to the method used in Example III. Other properties are summarized in the following Table 6.

TABLE 6

| Exp | Viscosity (25° C.) | S.P. (°C.) | Color (Gardner) | | Volatility (%) | Tack (in) | Shear (min) |
|---|---|---|---|---|---|---|---|
| | | | Initial | Aged | | | |
| C | 560,000 | 21° | 1½ | 10 | 5.4 | .44 | 59 |
| D | 74,000 | 13° | 1½ | 9 | 5.0 | .44 | 67 |

Although Experiment C did result in producing a resin of somewhat higher softening point and corresponding viscosity, other properties are essentially the same, particularly their shear and tack properties useful for pressure sensitive adhesives. Indeed, the softening point and viscosity of Experiment D could be somewhat increased with steam stripping.

The data of Table 6 indicate that the resins of Experiments C and D can be substituted for each other in pressure sensitive adhesive applications.

In the practice of this invention, a very satisfactory tackifier mixture for use in pressure sensitive adhesives comprises about 10 to about 50 parts by weight of the resin of this invention with, correspondingly, about 90 to about 50 parts by weight of a hydrocarbon-derived resin having a softening point in the range of about 80° C. to about 110° C. as the product of polymerizing a hydrocarbon mixture comprising about 30 to about 70 weight percent piperylene and, correspondingly, about 70 to about 30 weight percent 2-methyl-2-butene in the presence of aluminum chloride. When such a mixture of high softening point and low softening point resins are used for the preparation of pressure sensitive adhesives, it is generally preferred that about 50 to about 150 parts by weight of said mixture is used per 100 parts by weight of natural rubber or the various synthetic rubbers hereinbefore described. Such a mixture is particularly useful for admixing with unvulcanized rubbery block copolymers of butadiene or isoprene with styrene.

While certain representative embodiments and details have been shown for the purpose of illustrating the invention, it will be apparent to those skilled in this art that various changes and modifications may be made therein without departing from the spirit or scope of the invention.

What is claimed is:

1. An admixture comprised of 100 parts by weight hydrocarbon derived resin and about 100 to about 200 parts by weight of a rubber selected from at least one of natural rubber and synthetic rubber; where said synthetic rubber is selected from at least one of butadiene/styrene copolymers, isoprene/styrene copolymers and rubbery cis 1,4 addition homopolymers of 1,3-butadiene or isoprene and where said hydrocarbon derived resin is characterized by having a softening point in the range of about 5° C. to about 20° C. and a viscosity in the range of about 1000 to about 40,000 at about 25° C. which is the product of (i) polymerizing, in the presence of an inert diluent and a catalyst selected from at least one of boron trifluoride and boron trifluoride etherate derived from boron trifluoride and an ether having 2 to 6 carbon atoms, a mixture which consists essentially of (A) about 45 to about 65 weight percent piperylene and, correspondingly, about 55 to about 35 weight percent of at least one methyl branched tertiary monoolefin selected from at least one of the group consisting of 2-methyl-1-butene, 2-methyl-1-pentene, 2-methyl-2-pentene, 2,3-dimethyl-1-butene, and 2,3-dimethyl-2-butene and, optionally, (B) up to about 10 parts by weight per 100 parts by weight of said piperylene/branched olefin monomer mixture of at least one of piperylene dimers, piperylene trimers or other unsaturated hydrocarbons selected from the group consisting of 3-methyl-2-pentene, isoprene, and cyclic unsaturated hydrocarbons selected from cyclopentene, cyclohexene and 1,3-cyclopentadiene and (ii) steam stripping the product to remove light oil-like products, unreacted hydrocarbons and diluent.

2. The mixture of claim 1 where said butadiene/styrene copolymers and isoprene/styrene copolymers are block copolymers.

3. The mixture of claims 1 or 2 where said hydrocarbon-derived resin is characterized by having a viscosity in the range of about 1000 to about 40,000 centipoises at about 25° C., where said boron trifluoride etherate is a complex derived from boron trifluoride and an ether having 2 to 6 carbon atoms.

4. The mixture of claims 1 or 2 where, in said hydrocarbon derived resin, said methyl branched tertiary monoolefin is essentially 2-methyl-1-butene and where said catalyst is selected from boron trifluoride and boron trifluoride etherate, where said etherate is derived from boron trifluoride and diethyl ether.

* * * * *